US012327677B2

(12) United States Patent
Patel

(10) Patent No.: US 12,327,677 B2
(45) Date of Patent: Jun. 10, 2025

(54) METHOD FOR PRODUCING AN INDUCTIVE COMPONENT AND INDUCTIVE COMPONENT

(71) Applicant: Würth Elektronik eiSos GmbH & Co. KG, Waldenburg (DE)

(72) Inventor: Arpankumar Patel, Schwäbisch Hall (DE)

(73) Assignee: WÜRTH ELEKTRONIK EISOS GMBH & CO. KG, Waldenburg (DE)

( * ) Notice: Subject to any disclaimer, the term of this patent is extended or adjusted under 35 U.S.C. 154(b) by 1012 days.

(21) Appl. No.: 16/937,122

(22) Filed: Jul. 23, 2020

(65) Prior Publication Data

US 2021/0035734 A1 Feb. 4, 2021

(30) Foreign Application Priority Data

Jul. 31, 2019 (DE) .................... 10 2019 211 439.3

(51) Int. Cl.

| | |
|---|---|
| ***H01F 41/02*** | (2006.01) |
| ***H01F 1/22*** | (2006.01) |
| ***H01F 1/34*** | (2006.01) |
| ***H01F 17/04*** | (2006.01) |
| ***H01F 27/255*** | (2006.01) |
| ***H01F 27/28*** | (2006.01) |

(52) U.S. Cl.

CPC .......... *H01F 41/0246* (2013.01); *H01F 1/22* (2013.01); *H01F 1/34* (2013.01); *H01F 17/04* (2013.01); *H01F 27/255* (2013.01); *H01F 27/28* (2013.01)

(58) Field of Classification Search

CPC .......... H01F 1/34; H01F 1/344; H01F 27/255; H01F 27/30; H01F 41/0246

See application file for complete search history.

(56) References Cited

U.S. PATENT DOCUMENTS

| | | | | |
|---|---|---|---|---|
| 7,230,514 | B2 | 6/2007 | Brunner | |
| 2002/0013994 | A1 | 2/2002 | Ahn | |
| 2002/0017628 | A1 * | 2/2002 | Akimoto .................. | H01F 1/36 252/62.56 |

(Continued)

FOREIGN PATENT DOCUMENTS

| | | | |
|---|---|---|---|
| CN | 103304186 | A * | 9/2013 |
| CN | 103915236 | A | 7/2014 |

(Continued)

OTHER PUBLICATIONS

"Polyethylene." Wikipedia, Wikimedia Foundation, Feb. 21, 2023, https://en.wikipedia.org/w/index.php?title=Polyethylene&oldid=1140756349 (Year: 2023).*

*Primary Examiner* — Livius R. Cazan

(74) *Attorney, Agent, or Firm* — McGlew and Tuttle, P.C.

(57) ABSTRACT

In a method for producing an inductive component, a basic body, which includes a magnetic material, is sintered and subsequently comminuted. The comminuting has the effect of creating sintered particles, which are mixed with a binder to form at least one mixture. The at least one mixture and at least one coil are arranged in a mould and subsequently the binder is activated, so that the sintered particles form with the binder at least one magnetic core, which at least partially surrounds the at least one coil. The method allows easy and low-cost production of the inductive component with improved electromagnetic properties.

11 Claims, 6 Drawing Sheets

(56) References Cited

U.S. PATENT DOCUMENTS

| | | | |
|---|---|---|---|
| 2014/0097927 | A1 | 4/2014 | Yamamoto et al. |
| 2016/0035318 | A1 | 12/2016 | Jeong |
| 2018/0016157 | A1 | 1/2018 | Chen et al. |
| 2018/0057408 | A1 | 3/2018 | Kakuda et al. |

FOREIGN PATENT DOCUMENTS

| | | | | | |
|---|---|---|---|---|---|
| CN | 103304186 | B | | 8/2014 | |
| CN | 104425121 | A | | 3/2015 | |
| DE | 101 55 898 | A1 | | 5/2003 | |
| DE | 11 2016 000 536 | T5 | | 12/2017 | |
| EP | 1 820 587 | A1 | | 8/2007 | |
| EP | 2211360 | A2 | | 7/2010 | |
| EP | 2302647 | A1 | | 3/2011 | |
| JP | 06215968 | A | * | 8/1994 | |
| JP | H06-215968 | A | | 8/1994 | |
| JP | 2002-87877 | A | | 3/2002 | |
| JP | 2003109810 | A | * | 4/2003 | ......... H01F 41/0246 |
| JP | 2011091378 | A | | 5/2011 | |
| JP | 2013123007 | A | | 6/2013 | |
| JP | 2015-43459 | A | | 3/2015 | |
| KR | 1020160139969 | A1 | | 12/2016 | |
| RU | 2492050 | C2 | | 9/2013 | |
| RU | 2660915 | C2 | | 7/2018 | |
| TW | 503408 | B | | 9/2002 | |
| TW | 200421359 | A | | 10/2004 | |
| TW | 201618131 | A | | 5/2016 | |
| TW | 201838951 | A | | 11/2018 | |
| WO | 2016 025792 | A1 | | 2/2016 | |
| WO | 2016123598 | A1 | | 8/2016 | |
| WO | 2016124526 | A1 | | 8/2016 | |

* cited by examiner

METHOD FOR PRODUCING AN INDUCTIVE COMPONENT AND INDUCTIVE COMPONENT

CROSS-REFERENCES TO RELATED APPLICATIONS

This application claims the priority of German Patent Application, Serial No. 10 2019 211 439.3, filed Jul. 31, 2019, pursuant to 35 U.S.C. 119(a)-(d), the content of which is incorporated herein by reference in its entirety as if fully set forth herein.

FIELD OF THE INVENTION

The invention relates to a method for producing an inductive component and to an inductive component.

BACKGROUND OF THE INVENTION

EP 2 211 360 A2 discloses a method for producing an inductive component. A solid body is successively formed from a coil and a number of magnetic powders. The body is then arranged in a furnace and sintered at about 900° C. to form the inductive component.

SUMMARY OF THE INVENTION

The invention is based on the object of providing a method that allows easy and low-cost production of an inductive component with improved electromagnetic properties.

This object is achieved by a method for producing an inductive component with the steps of: providing a basic body comprising a magnetic material, sintering the basic body, comminuting the sintered basic body to form sintered particles, producing at least one mixture from the sintered particles and a binder, arranging the at least one mixture and at least one coil in a mould, and activating the binder in the at least one mixture, so that the sintered particles form with the binder at least one magnetic core, which at least partially surrounds the at least one coil. Firstly, a basic body which comprises a magnetic material is provided. The magnetic material may be produced for example by reprocessing magnetic waste material or by processing raw material. For example, magnetic waste material may be comminuted, filtered and/or mixed and activated to form the magnetic material. The basic body is formed in particular from the magnetic material. The sintering of the basic body can be performed in an easy and low-cost way at a comparatively high temperature, since the sintering is performed without the at least one coil and the melting temperature of the material of the at least one coil does not have to be taken into account. After the sintering, the sintered basic body is comminuted, so that sintered particles are created. The comminuting and/or the selecting of the sintered particles for producing the at least one mixture allow the electromagnetic properties of the inductive component to be influenced. Subsequently, at least one mixture is produced from the sintered particles and a binder. The at least one mixture is arranged together with the at least one coil in a mould and subsequently the binder is activated, so that the binder bonds the sintered particles to form at least one magnetic core. The magnetic core formed surrounds the at least one coil in the desired way. Preferably, the at least one magnetic core surrounds the at least one coil completely, apart from terminal contacts. Because the sintering is performed without the at least one coil and the sintered particles are bonded by means of the binder to form the at least one magnetic core, the production of the inductive component is easy and low-cost. The comminuting of the sintered basic body and the selection of the sintered particles used for producing the at least one mixture allow the electromagnetic properties of the inductive component to be specifically influenced.

A method, wherein the magnetic material comprises at least one ferrite material, ensures easy and low-cost production of the inductive component with improved electromagnetic properties. The at least one ferrite material is available easily and at low cost. The at least one ferrite material allows a high inductance and/or soft saturation. The at least one ferrite material allows comparatively lower AC voltage losses (AC losses) and/or comparatively higher voltages in high potential tests (AC HiPot test). The at least one ferrite material comprises in particular manganese (Mn), zinc (Zn) and/or nickel (Ni), for example NiZn and/or MnZn.

A method, wherein the sintering is performed at a temperature $T_S$, where: $T_S \geq 1000°$ C., in particular $T_S \geq 1100°$ C., in particular $T_S \geq 1200°$ C., ensures easy and low-cost production of the inductive component with improved electromagnetic properties. Because the sintering is performed without the at least one coil, the sintering is possible at a comparatively high temperature $T_S$. The time taken for the sintering operation is shorter the higher the temperature $T_S$ is. The time taken for the sintering operation can accordingly be shortened. Sintering influences the electromagnetic properties of the sintered particles. Because the temperature $T_S$ and the time taken for the sintering can be easily and flexibly selected or set, the electromagnetic properties can be influenced in the desired way.

A method, wherein the sintered particles have a respective aspect ratio and, before producing the at least one mixture, the aspect ratios are at least partially reduced, ensures easy and low-cost production of the inductive component with improved electromagnetic properties. The aspect ratio characterizes the ratio of a minimum dimension $A_{min}$ to a maximum dimension $A_{max}$ of the respective sintered particle. Consequently, the following applies for the aspect ratio A:$A=A_{min}/A_{max}$. For producing the at least one mixture, the sintered particles are worked in such a way that their form resembles a spherical form and/or cuboidal form. The aspect ratios of the sintered particles are at least partially reduced by working. Because the sintered particles approximate in their form to a spherical form or cuboidal form, the at least one magnetic core has a substantially uniform density, and consequently substantially uniform electromagnetic properties. In addition, the at least one magnetic core has great mechanical stability, since the sintered particles are uniformly wetted by the binder.

A method, wherein, before producing the at least one mixture, the sintered particles are worked by means of a ball mill, ensures easy and low-cost production of the inductive component with improved electromagnetic properties. Because the sintered particles are worked by means of a ball mill, their form approximates to a spherical form and/or cuboidal form. The working preferably has the effect that the aspect ratios of the sintered particles are at least partially reduced. The ball mill comprises a rotating drum, in which balls, for example metal balls, are located. The sintered particles are fed to the ball mill as ground material and are worked by the balls in the drum in the way described.

A method, wherein, before producing the at least one mixture, the sintered particles are separated on the basis of the particle form and/or the particle size, ensures easy and low-cost production of the inductive component with improved electromagnetic properties. Because the sintered particles are separated on the basis of the particle form and/or the particle size, the sintered particles used for the at least one mixture can be selected in the desired way. The separating or selecting on the basis of the particle form is performed for example in such a way that sintered particles with an aspect ratio of A of at least 0.5, in particular at least 0.6, in particular at least 0.7, in particular at least 0.8, and in particular at least 0.9, are separated and used for producing the at least one mixture. Furthermore, the sintered particles become for example separate on the basis of the particle size in such a way that a first coarse fraction and a second fine fraction of sintered particles are produced. Furthermore, the sintered particles are separated on the basis of the particle size for example in such a way that the particle size is in a desired range. The selection of the sintered particles on the basis of their particle form and/or particle size allows the electromagnetic properties of the at least one core to be specifically influenced.

A method, wherein at least 70% of the sintered particles used for producing the at least one mixture have a respective aspect ratio A, for which the following applies: $0.5 \leq A \leq 1$, in particular $0.6 \leq A \leq 1$, in particular $0.7 \leq A \leq 1$, in particular $0.8 \leq A \leq 1$, and in particular $0.9 \leq A \leq 1$, ensures easy and low-cost production of the inductive component with improved electromagnetic properties. Preferably, at least 80%, in particular at least 90%, and in particular at least 95%, of the sintered particles used for producing the at least one mixture have the respective aspect ratio A. The aspect ratio A ensures that the sintered particles come as close as possible in their form to a spherical form or cuboidal form. The aspect ratio A characterizes the ratio of a minimum dimension $A_{min}$ to a maximum dimension $A_{max}$ of the respective sintered particle. The following applies for the aspect ratio A: $A = A_{min}/A_{max}$. Preferably, the following applies for the aspect ratio A: $0.5 \leq A \leq 1$, in particular $0.6 \leq A \leq 0.9$, and in particular $0.7 \leq A \leq 0.8$. The aspect ratio A may be chosen in dependence on the desired distribution of the magnetic flux. Advantageous properties are obtained with an aspect ratio of $A \approx 0.75$.

A method, wherein at least 70% of the sintered particles used for producing the at least one mixture have a respective minimum dimension $A_{min}$, for which the following applies: $10\ \mu m \leq A_{min} \leq 1000\ \mu m$, ensures easy and low-cost production of the inductive component with improved electromagnetic properties. Preferably, at least 80%, in particular at least 90%, and in particular at least 95%, of the sintered particles used have the respective minimum dimension $A_{min}$. Preferably, the sintered particles used are separated on the basis of their particle size into a first fraction with first sintered particles and into a second fraction with second sintered particles.

The following preferably applies for a minimum dimension $A_{1min}$ of the first sintered particles: $500\ \mu m \leq A_{1min} \leq 1000\ \mu m$, in particular $600\ \mu m \leq A_{1min} \leq 900\ \mu m$, and in particular $700\ \mu m \leq A_{1min} \leq 800\ \mu m$. The following preferably applies for a minimum dimension $A_{2min}$ of the second sintered particles: $10\ \mu m \leq A_2\ min \leq 500\ \mu m$, in particular $100\ \mu m \leq A_{2min}\ 400\ \mu m$, and in particular $200\ \mu m \leq A_{2min} \leq 300\ \mu m$. Preferably, at least 70%, in particular at least 80%, in particular at least 90%, and in particular at least 95%, of the sintered particles used have the minimum dimension $A_{1min}$ or $A_{2min}$.

A method, wherein, before producing the at least one mixture, the sintered particles are separated into a first fraction with first sintered particles and into a second fraction with second sintered particles, which are different from the first sintered particles, ensures easy and low-cost production of the inductive component with improved electromagnetic properties. Preferably, the first sintered particles and the second sintered particles differ in their particle form and/or in their particle size. Preferably, the sintered particles are separated on the basis of their aspect ratio and/or their particle size, in particular their minimum dimension and/or their maximum dimension. The selective selection of the sintered particles used allows the electromagnetic properties of the inductive component to be influenced in the desired way.

Preferably, the sintered particles are separated into a first coarse fraction with first sintered particles and into a second fine fraction with second sintered particles, which are smaller in comparison with the first sintered particles. Because the sintered particles are separated into a first coarse fraction and a second fine fraction, a first mixture for forming a first magnetic core and a second mixture for forming a second magnetic core can be produced. For producing the first mixture, the first sintered particles are mixed with a binder. Correspondingly, for producing the second mixture, the second sintered particles are mixed with a binder. The at least one coil and the first mixture are arranged in a mould and subsequently the binder of the first mixture is activated, so that the first sintered particles form the first magnetic core with the binder. The component obtained, with the at least one coil and the first magnetic core, is arranged together with the second mixture in a second mould. Subsequently, the binder in the second mixture is activated, so that the second sintered particles form a second magnetic core with the binder. The second magnetic core at least partially surrounds the first magnetic core and the at least one coil.

The following preferably applies for a minimum dimension $A_{1min}$ of the first sintered particles: $500\ \mu m \leq A_{1min} \leq 1000\ \mu m$, in particular $600\ \mu m \leq A_{1min} \leq 900\ \mu m$, and in particular $700\ \mu m \leq A_{1min} \leq 800\ \mu m$. The following preferably applies for a minimum dimension $A_{2min}$ of the second sintered particles: $10\ \mu m \leq A_{2min} \leq 500\ \mu m$, in particular $100\ \mu m \leq A_{2min}.\ 400\ \mu m$, and in particular $200\ \mu m \leq A_{2min} \leq 300\ \mu m$. Preferably, at least 70%, in particular at least 80%, in particular at least 90%, and in particular at least 95%, of the sintered particles used have the minimum dimension $A_{1min}$ or $A_{2min}$.

The two-stage production method allows the electromagnetic and mechanical properties of the inductive component to be optimized. The division of the sintered particles into a number of fractions and the selection and division of the sintered particles allow the electromagnetic properties to be influenced in the desired way.

Preferably, the first magnetic core surrounds the at least one coil completely, apart from terminal contacts. Preferably, the second magnetic core surrounds the first magnetic core and the at least one coil completely, apart from terminal contacts. The producing of a number of magnetic cores with different sintered particles allows the electromagnetic and/or mechanical properties of the component to be influenced in the desired way. Because the comparatively smaller second sintered particles form the outer second magnetic core, the component has in particular a smooth surface.

A method, wherein a first magnetic core is produced with first sintered particles, and wherein a second magnetic core is produced with second sintered particles, which differ from the first sintered particles, ensures easy and low-cost production of the inductive component with improved electromagnetic properties. The sintered particles are preferably separated on the basis of their particle form and/or their particle size into first sintered particles and second sintered particles. Preferably, the sintered particles are separated on the basis of their particle size, in particular their minimum dimension and/or their maximum dimension, into a first coarse fraction with first sintered particles and a second fine fraction with second sintered particles, which are smaller in comparison with the first sintered particles. A first mixture is produced from the first sintered particles and a binder. Correspondingly, a second mixture is produced from the second sintered particles and a binder. The at least one coil and the first mixture are arranged in a first mould and subsequently the binder in the first mixture is activated, so that the first sintered particles form the first magnetic core with the binder. The first magnetic core at least partially surrounds the at least one coil. The component created, with the at least one coil and the first magnetic core, and the second mixture are arranged in a second mould and subsequently the binder in the second mixture is activated, so that the second sintered particles form the second magnetic core with the binder. The second magnetic core at least partially surrounds the first magnetic core and the at least one coil. Preferably, the first magnetic core surrounds the at least one coil completely, apart from terminal contacts. Preferably, the second magnetic core surrounds the first magnetic core and the at least one coil completely, apart from terminal contacts. The producing of a number of magnetic cores with different sintered particles allows the electromagnetic and/or mechanical properties of the component to be influenced in the desired way.

A method, wherein the binder is activated by increasing a temperature and/or by increasing a pressure, ensures easy and low-cost production of the inductive component with improved electromagnetic properties. The binder is activated in an easy way by increasing the temperature of the at least one mixture and/or by increasing the pressure on the at least one mixture. The activating of the binder has the effect that the sintered particles are bonded to one another to form the at least one core. A polymer material and/or a resin is used for example as the binder.

A method, wherein the at least one mixture is produced in such a way that the following applies for a mass ratio m of the sintered particles to the binder: $75/25 \leq m \leq 99/1$, in particular $80/20 \leq m \leq 98/2$, and in particular $85/15 \leq m \leq 95/5$, ensures easy and low-cost production of the inductive component with improved electromagnetic properties. The mass ratio m is used to set the density and/or the air gap of the inductive component in the desired way. The mass ratio m describes the ratio of the mass $m_P$ of the sintered particles to the mass $m_B$ of the binder. The following applies for the mass ratio m: $m = m_P/m_B$. With a higher proportion by mass of the sintered particles to the binder, the density increases and/or the air gap of the inductive component decreases, and vice versa. The density and/or the air gap influence the saturation behaviour of the inductive component.

A method, wherein the basic body is provided by pressing the magnetic material, ensures easy and low-cost production of the inductive component with improved electromagnetic properties. The basic body is produced in an easy way by pressing of the magnetic material. The magnetic material preferably takes the form of granules and/or powder. The magnetic material comprises at least one ferrite material. Preferably, the magnetic material is provided in such a way that at least one raw material and/or at least one waste material is processed and/or activated. Preferably, a number of raw materials and/or a number of waste materials are mixed and/or processed. Preferably, magnetic waste materials are reprocessed.

The invention is also based on the object of providing an inductive component that can be produced easily, at low cost and with improved electromagnetic properties.

This object is achieved by an inductive component comprising at least one coil, at least one magnetic core, which at least partially surrounds the at least one coil, wherein the at least one core is formed by means of sintered particles and a binder. The advantages of the inductive component correspond to the already described advantages of the method. The inductive component may in particular also be developed with the features of the inventive method for producing an inductive component. The sintered particles are bonded with the activated binder to form the at least one core. The sintered particles comprise a magnetic material, in particular at least one ferrite material. The sintered particles have a respective particle form, in particular a respective aspect ratio, and/or a respective particle size, as has already been described in relation to the inventive method. Reference is made to the corresponding features.

An inductive component, wherein a first magnetic core with first sintered particles at least partially surrounds the at least one coil, and wherein a second magnetic core with second sintered particles, which are different from the first sintered particles, at least partially surrounds the first magnetic core and the at least one coil, ensures easy and low-cost production with improved electromagnetic properties. The formation of a number of magnetic cores and the selection of the sintered particles used for this allow the electromagnetic properties to be influenced in the desired way.

Further features, advantages and details of the invention emerge from the following description of an exemplary embodiment.

DESCRIPTION OF THE PREFERRED EMBODIMENT

Figure 1:
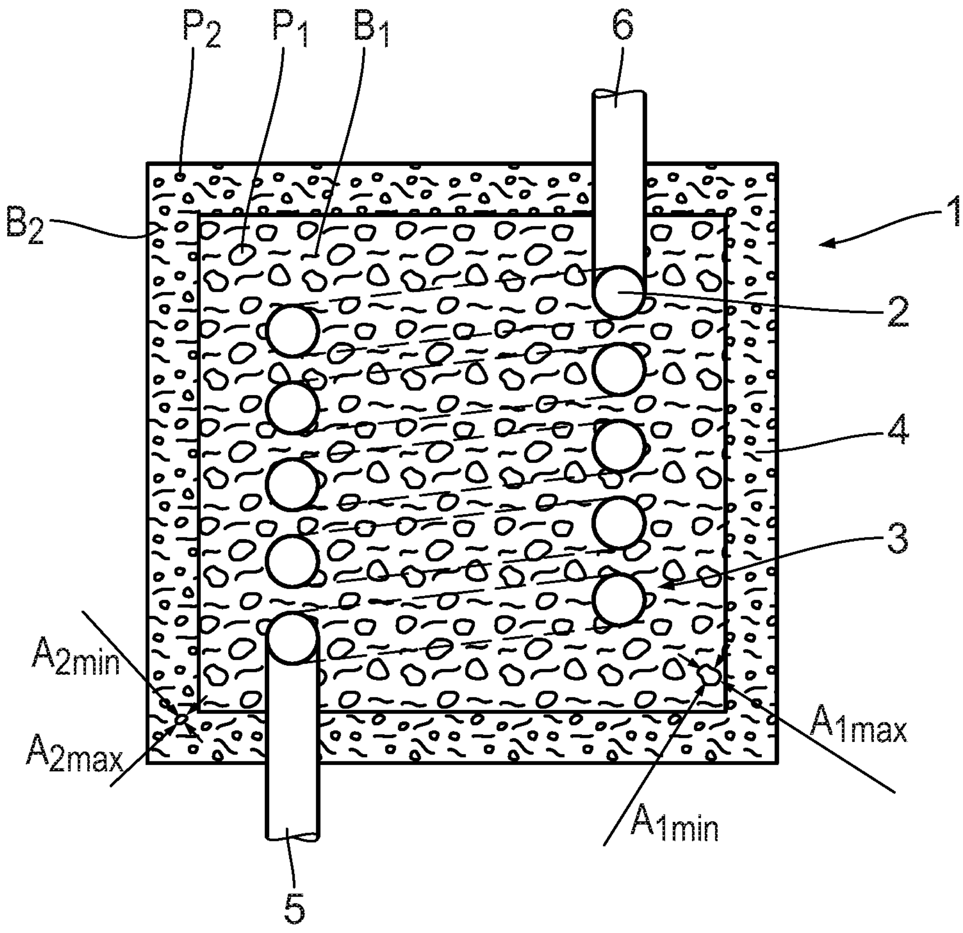
FIG. 1 shows a sectional representation of an inductive component.

An inductive component 1 comprises a coil 2, a first magnetic core 3 and a second magnetic core 4. The coil 2 is formed for example as a cylindrical coil. The coil 2 consists of an electrically conductive material. The coil 2 has terminal contacts 5, 6.

The first magnetic core 3 surrounds the coil 2. The first magnetic core 3 comprises first sintered particles $P_1$, which are bonded to one another by means of a first binder $B_1$. The second magnetic core 4 surrounds the first magnetic core 3 and the coil 2. The second magnetic core 4 comprises second sintered particles $P_2$, which are bonded to one another by means of a second binder $B_2$. The terminal contacts 5, 6 are led through the first magnetic core 3 and the second magnetic core 4 to the outside.

The first sintered particles $P_1$ have in each case a minimum dimension $A_{1min}$ and a maximum dimension $A_{1max}$. The first sintered particles $P_1$ have a respective first aspect ratio $A_1$, where: $A_1=A_{1min}/A_{1max}$. At least 70%, in particular at least 80%, in particular at least 90%, and in particular at least 95%, of the first sintered particles $P_1$ have a respective minimum dimension $A_{1min}$, where: 500 $\mu m \le A_{1min} \le 1000$ μm, in particular 600 $\mu m \le A_{1min} \le 900$ μm, and in particular 700 $\mu m \le A_{1min} \le 800$ μm. At least 70%, in particular at least 80%, in particular at least 90%, and in particular at least 95%, of the first sintered particles $P_1$ have a respective aspect ratio $A_1$, where: $0.5 \le A_1 \le 1$, in particular $0.6 \le A_1 \le 1$, in particular $0.7 \le A_1 \le 1$, in particular $0.8 \le A_1 \le 1$, and in particular $0.9 \le A_1 \le 1$. Preferably, the following applies for the aspect ratio $A_1$: $0.5 \le A_1 \le 1$, in particular $0.6 \le A_1 \le 0.9$, and in particular $0.7 \le A_1 \le 0.8$. The aspect ratio $A_1$ may be chosen in dependence on the desired distribution of the magnetic flux. Advantageous properties are obtained with an aspect ratio of $A_1 \approx 0.75$.

The second sintered particles $P_2$ have in each case a minimum dimension $A_{2min}$ and a maximum dimension $A_{2max}$. The second sintered particles $P_2$ have a respective second aspect ratio $A_2$, where: $A_2=A_{2min}/A_{2max}$. At least 70%, in particular at least 80%, in particular at least 90% and in particular at least 95%, of the second sintered particles $P_2$ have a respective minimum dimension $A_{2min}$, where: 10 $\mu m \le A_{2min} \le 500$ μm, in particular 100 $\mu m \le A_{2min} \le 400$ μm, and in particular 200 $\mu m \le A_2$ $min \le 300$ μm. At least 70%, in particular at least 80%, in particular at least 90%, and in particular at least 95%, of the second sintered particles $P_2$ have a respective aspect ratio $A_2$, where: $0.5 \le A_2 \le 1$, in particular $0.6 \le A_2 \le 1$, in particular $0.7 \le A_2 \le 1$, in particular $0.8 \le A_2 \le 1$, and in particular $0.9 \le A_2 \le 1$. Preferably, the following applies for the aspect ratio $A_2$: $0.5 \le A_2 \le 1$, in particular $0.6 \le A_2 \le 0.9$, and in particular $0.7 \le A_2 \le 0.8$. The aspect ratio $A_2$ may be chosen in dependence on the desired distribution of the magnetic flux. Advantageous properties are obtained with an aspect ratio of $A_2 \approx 0.75$.

The first sintered particles $P_1$ and the second sintered particles $P_2$ differ in their particle form or in their aspect ratio $A_1$ or $A_2$ and/or in their particle size or in their minimum dimension $A_{1min}$ or $A_{2min}$, respectively.

Figure 2A:
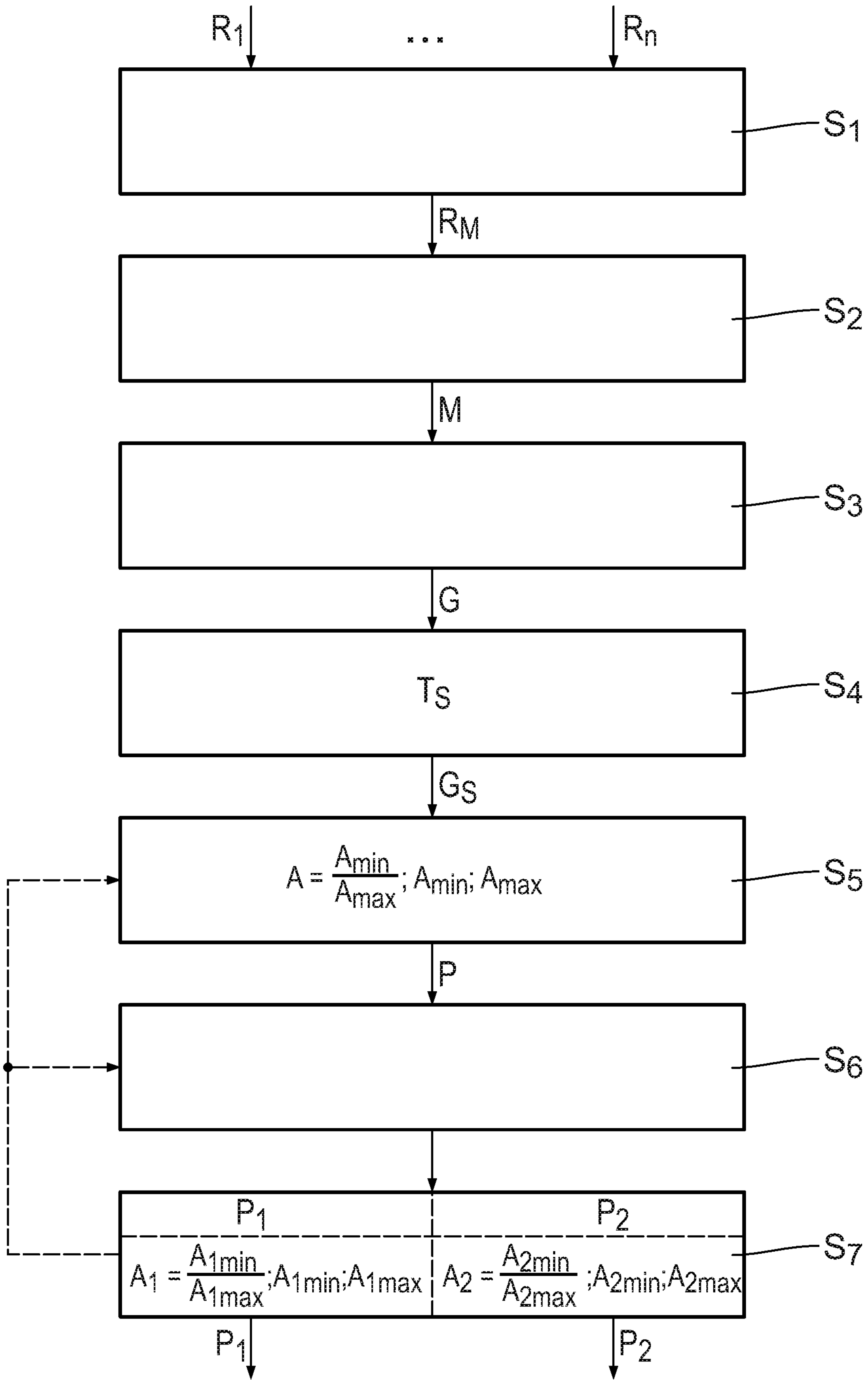
FIGS. 2A and 2B show a flow diagram with the steps for producing the inductive component according to FIG. 1.
Figure 2B:
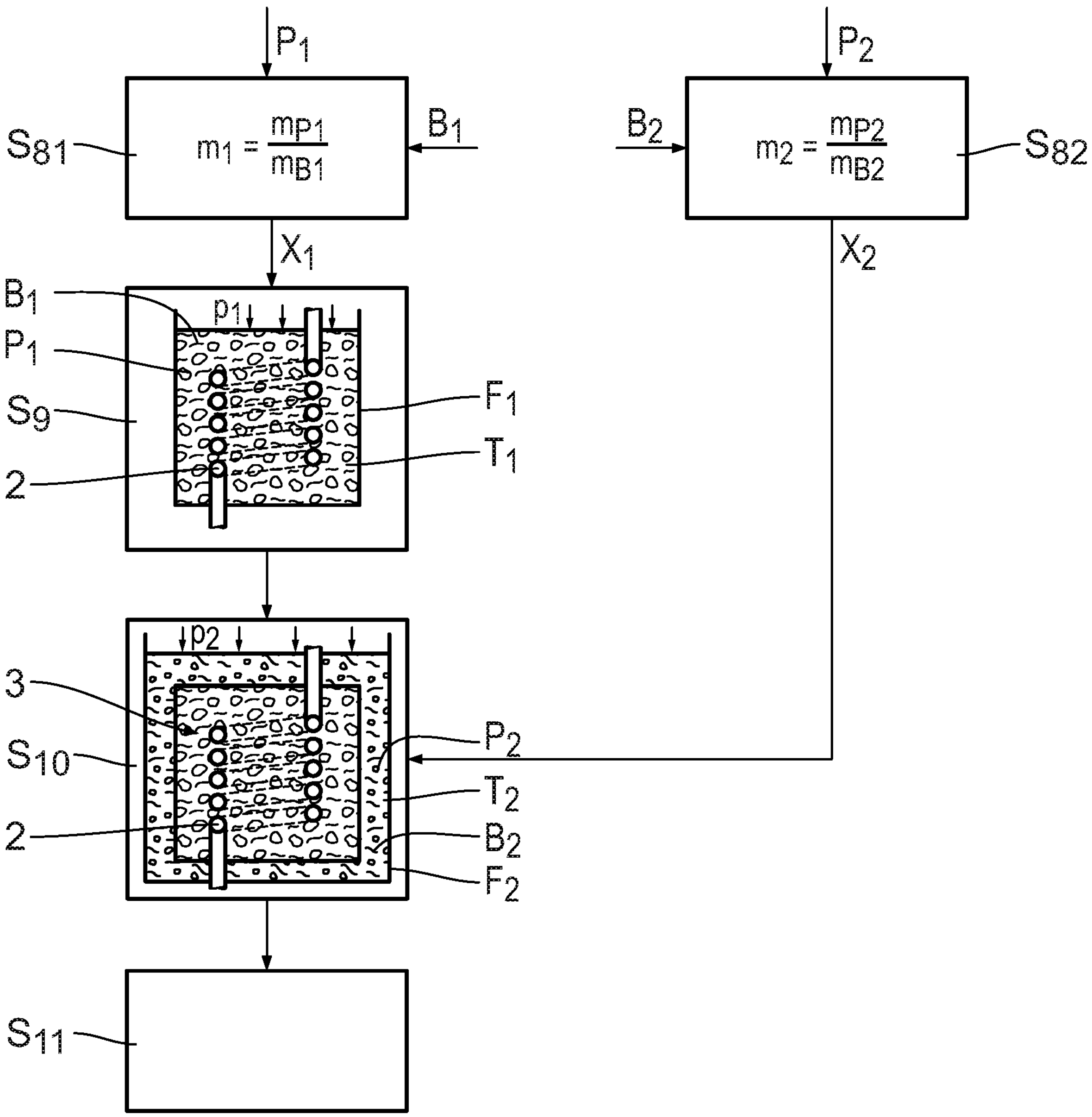

The method for producing the inductive component 1 is described below on the basis of FIG. 2:

In a step $S_1$, firstly starting materials $R_1$ to $R_n$ are mixed with one another to form a starting material mixture $R_M$. The starting materials $R_1$ to $R_n$ are for example raw materials and/or waste materials, which are to be recycled or reprocessed. The starting materials $R_1$ to $R_n$ comprise for example zinc oxide (ZnO), manganese oxide (MnO) and/or iron oxide.

The starting material mixture $R_M$ is activated and/or calcined in a step S2. In the calcining, a starting material mixture $R_M$ containing calcium and magnesium carbonate is heated to achieve dewatering and/or decomposition.

The activated raw material mixture $R_M$ forms a magnetic material M. The magnetic material M is for example in the form of powder and/or in the form of granules. The magnetic material M comprises at least one ferrite material, for example MnZn ferrite material and/or NiZn ferrite material.

The magnetic material M is pressed in a step $S_3$ to form a basic body G. The basic body G is also referred to as a green body.

In a subsequent step $S_4$, the basic body G is sintered. The sintering is performed at a temperature $T_S$, where: $T_S \ge 1000°$ C., in particular $T_S \ge 1100°$ C., in particular $T_S \ge 1200°$ C. The sintered basic body is denoted by $G_S$.

In a step $S_5$, the sintered basic body $G_S$ is comminuted. The comminuting is performed for example by means of a crushing machine or comminuting machine (crusher). The comminuting creates sintered particles, which are denoted generally by P. The sintered particles P have in each case a minimum dimension $A_{min}$ and a maximum dimension $A_{max}$, which define a respective aspect ratio A. The following applies for the respective aspect ratio: $A=A_{min}/A_{max}$. After the comminuting of the sintered basic body $G_S$, the aspect ratios A of the sintered particles P widely diverge. In particular, when comminuting, sintered particles P with an elongated form, which have a respective small aspect ratio A, are also created. For the further processing of the sintered particles P, a form that corresponds substantially to a spherical form and/or a cuboidal form is desired.

In a step $S_6$, the aspect ratios A of the sintered particles P are reduced. This means that the maximum dimension $A_{max}$ of the respective sintered particle P is brought closer to the minimum dimension $A_{min}$. For this purpose, the sintered particles P are for example worked by means of a ball mill. The ball mill comprises a drum and metal balls arranged therein. The sintered particles P are introduced into the drum and, on the basis of a rotation of the drum, are worked by means of the metal balls, by further commination and/or friction, so that the aspect ratios A of the sintered particles P are at least partially reduced.

In a step $S_7$, the sintered particles P are separated on the basis of their particle form and/or on the basis of their particle size. The sintered particles P are separated into a first fraction with first sintered particles $P_1$ and a second fraction with second sintered particles $P_2$. The first sintered particles $P_1$ have the minimum dimension $A_{1min}$ and the maximum dimension $A_{1max}$ and also the aspect ratio $A_1$, whereas the second sintered particles $P_2$ have the minimum dimension $A_2$ min, the maximum dimension $A_{2max}$ and the aspect ratio $A_2$. The first fraction comprises coarser particles in comparison with the second fraction. Accordingly, the following applies for at least 70% of the sintered particles $P_1$, $P_2$: $A_{1min}>A_{2min}$ and/or $A_{1max}>A_2$ min and/or $A_{1min}>A_{2max}$.

Sintered particles P segregated in step $S_7$, belonging neither to the first fraction nor to the second fraction, can be returned and comminuted further in step $S_5$ and/or worked further in step $S_6$. This is illustrated in FIG. 2 by the dashed lines.

In a subsequent step $S_{81}$, a first mixture $X_1$ is produced from the first sintered particles $P_1$ and the first binder $B_1$. Correspondingly, in a step $S_{82}$, a second mixture $X_2$ is produced from the second sintered particles $P_2$ and the second binder $B_2$. The binders $B_1$ and $B_2$ may be the same or different. The binders $B_1$, $B_2$ are for example a polymer plastic and/or a resin.

The first mixture $X_1$ has a mass ratio $m_1$ of the mass $m_{P1}$ of the first sintered particles $P_1$ to the mass $m_{B1}$ of the first binder $B_1$. Consequently, the following applies for the mass ratio $m{:}m_1=m_{P1}/m_{B1}$. Preferably, the following applies for the mass ratio $m_1$: $75/25 \leq m_1 \leq 99/1$, in particular $80/20 \leq m_1 \leq 98/2$, and $85/15 \leq m_1 \leq 95/5$. The second mixture $X_2$ has a mass ratio $m_2$ of the mass $m_{P2}$ of the second sintered particles $P_2$ to the mass $m_{B2}$ of the second binder $B_2$. Consequently, the following applies for the mass ratio $m_2{:}m_2=m_{P2}/m_{B2}$. Preferably, the following applies for the mass ratio $m_2$: $75/25 \leq m_2 \leq 99/1$, in particular $80/20 \leq m_2 \leq 98/2$, and $85/15 \leq m_2 \leq 95/5$. The mass ratio is denoted generally by m.

In a step $S_9$, the first mixture $X_1$ and the coil 2 are arranged in a first mould $F_1$. Subsequently, the first binder $B_1$ is activated, so that the first binder $B_1$ bonds the first sintered particles $P_1$ to form the first magnetic core 3. For activating the first binder $B_1$, a pressure $p_1$ on the first mixture $X_1$ and/or a temperature $T_1$ of the first mixture $X_1$ is increased. After the curing of the first binder $B_1$, the first magnetic core 3 with the coil 2 is demoulded.

In a subsequent step $S_{10}$. the first magnetic core 3 is arranged with the coil 2 and the second mixture $X_2$ in a second mould $F_2$. Subsequently, the second binder $B_2$ is activated, so that the second binder $B_2$ bonds the second sintered particles $P_2$ to form the second magnetic core 4. The second binder $B_2$ is activated by increasing a pressure $p_2$ on the second mixture $X_2$ and/or by increasing a temperature $T_2$ of the second mixture $X_2$. After the curing of the second binder $B_2$, the second core 4 with the first magnetic core 3 and the coil 2 is demoulded.

In a step S11, the inductive component 1 is provided by the demoulding.

Figure 3:
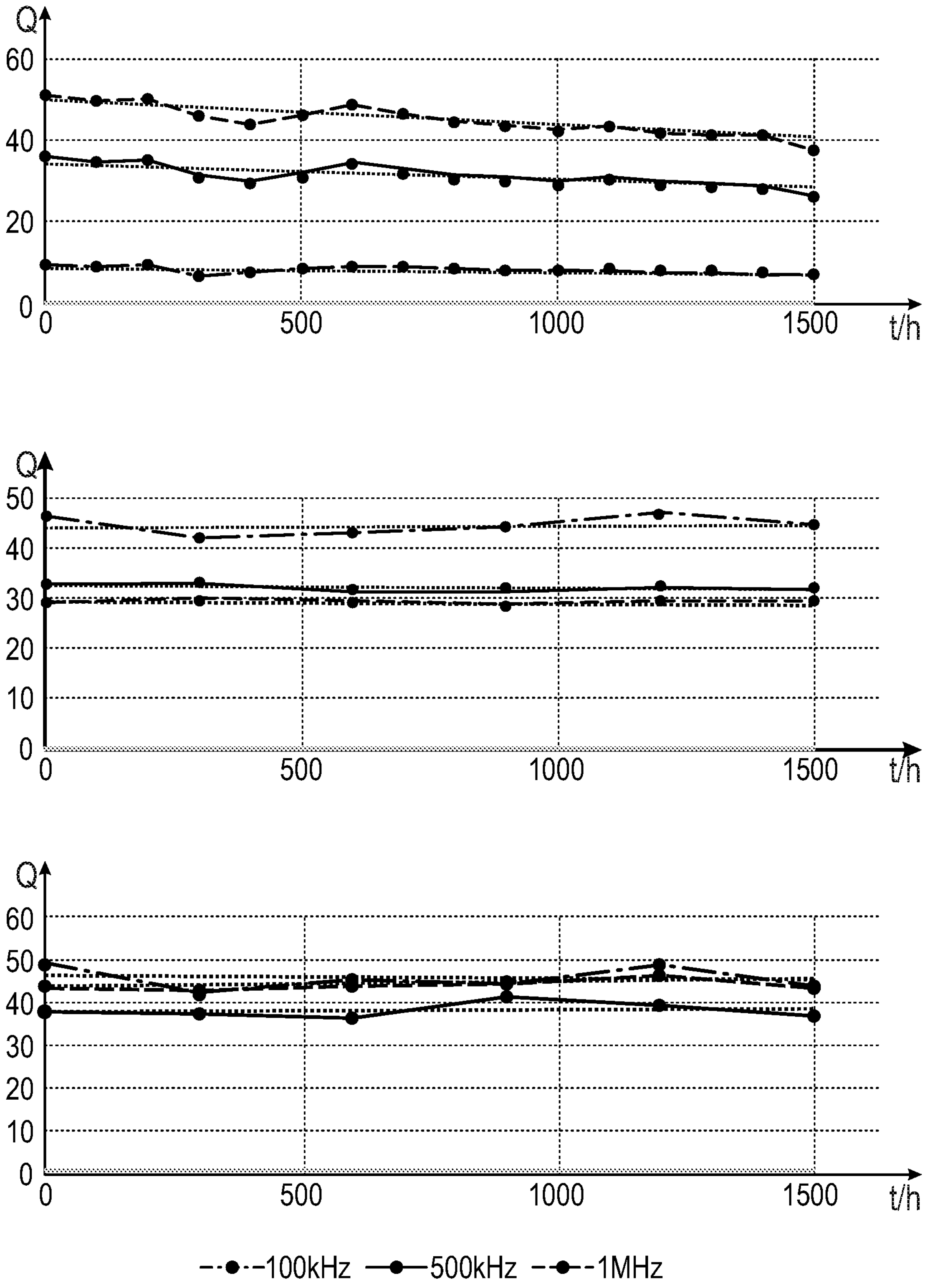
FIG. 3 shows diagrams of the quality factor Q as a function of the time t and the frequency f, the upper diagram illustrating an inductive component comprising an iron alloy according to the prior art, the middle diagram illustrating an inductive component according to the invention with ferrite material comprising manganese and zinc and the lower diagram illustrating an inductive component according to the invention with ferrite material comprising nickel and zinc.

FIG. 3 illustrates measurement curves for the quality factor Q (Q value) for frequencies f of 100 kHz, 500 kHz and 1 MHz over time t. The quality factor Q of the inductive components 1 according to the invention (cf. the middle and lower diagrams) is more constant over time t compared to the inductive component according to the prior art (cf. the upper diagram). In addition to the measurement curves, smoothed measurement curves, which are intended to make easier comparison with regard to the constancy of the quality factors Q possible, are illustrated in FIG. 3.

Figure 4:
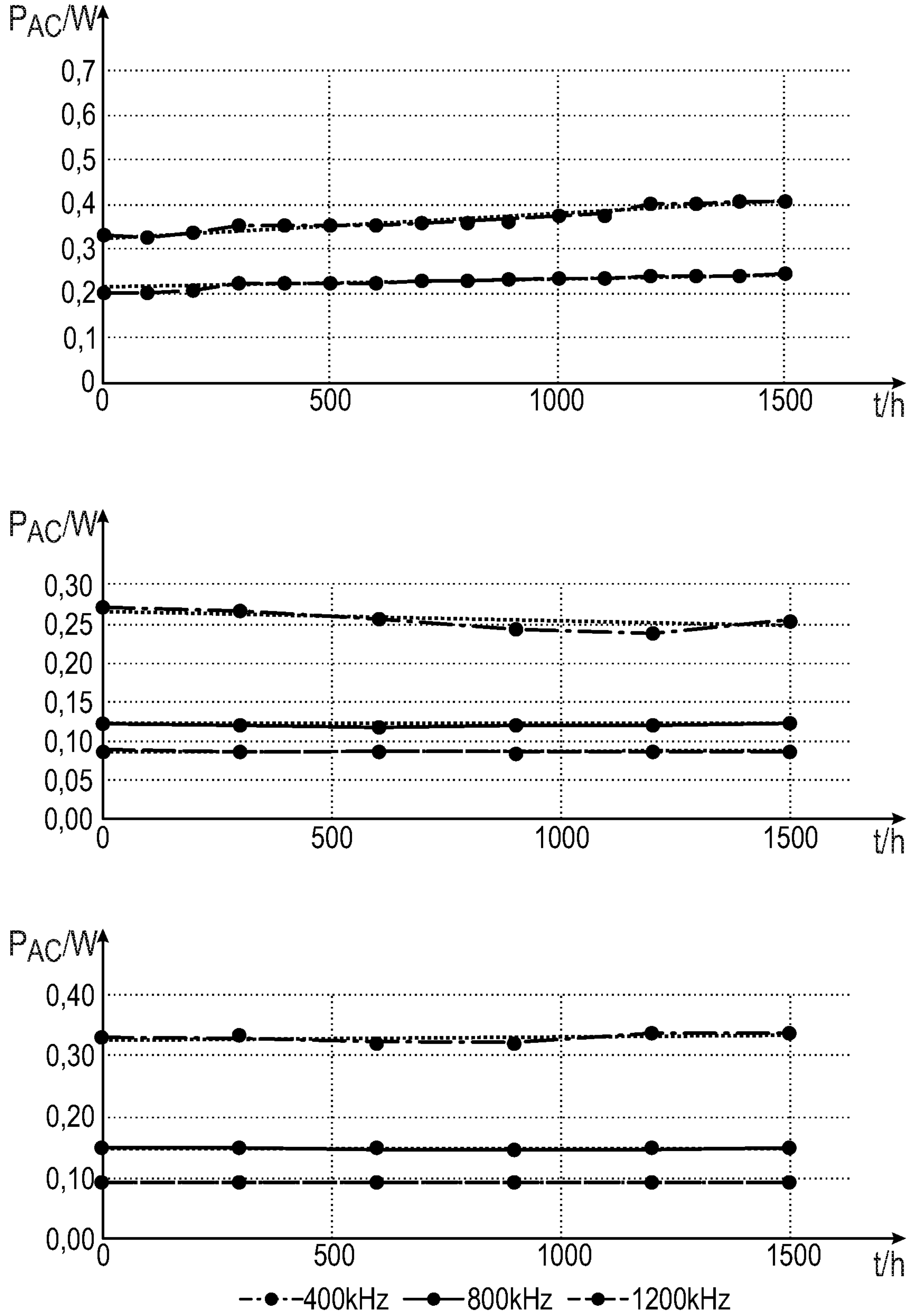
FIG. 4 shows diagrams of the AC voltage power loss $P_{AC}$ as a function of the time t and the frequency f, the upper diagram illustrating an inductive component comprising an iron alloy according to the prior art, the middle diagram illustrating an inductive component according to the invention with ferrite material comprising manganese and zinc and the lower diagram illustrating an inductive component according to the invention with ferrite material comprising nickel and zinc.

In a corresponding way, FIG. 4 illustrates measurement curves for the AC voltage power loss $P_{AC}$ for frequencies f of 400 kHz and 1.2 MHz over time t. The AC voltage power loss $P_{AC}$ of the inductive components 1 according to the invention (cf. the middle and lower diagrams) is more constant over time t in comparison with the inductive component according to the prior art (cf. the upper diagram). In addition to the measurement curves, smoothed measurement curves, which are intended to make easier comparison with regard to the constancy of the AC voltage power loss $P_{AC}$ possible, are illustrated in FIG. 4.

Figure 5:
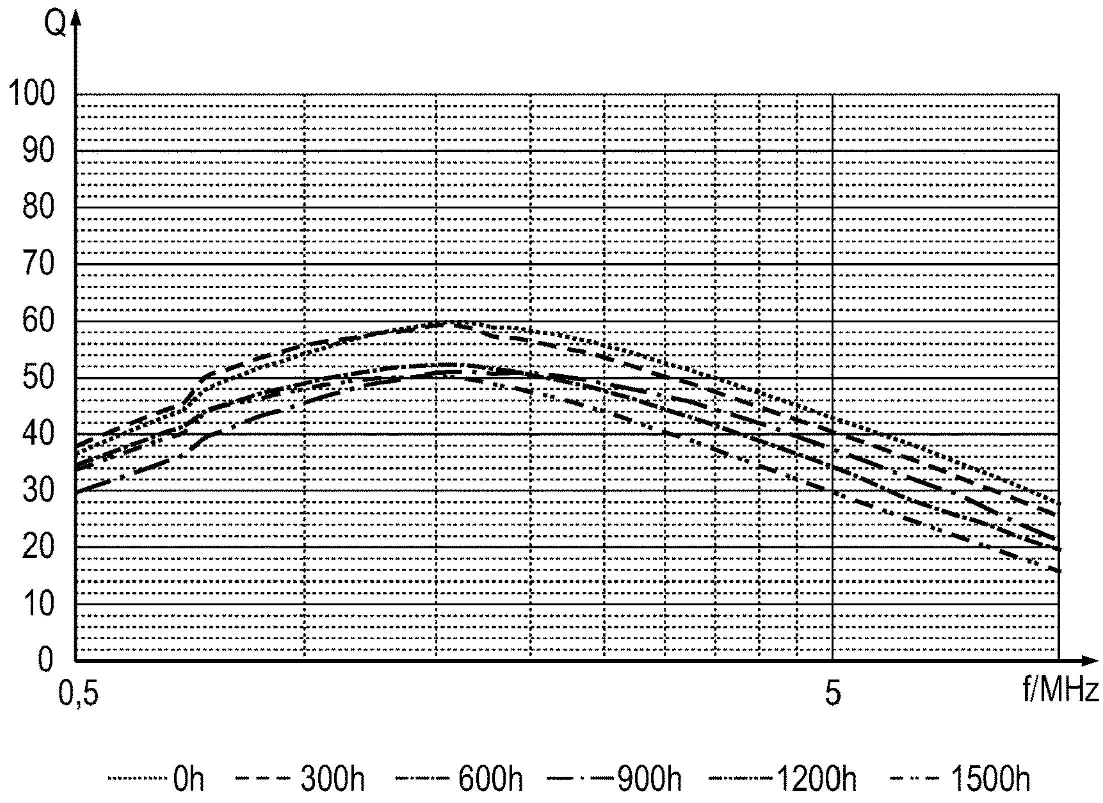
FIG. 5 shows a diagram of the quality factor Q as a function of the frequency f and the time t for an inductive component comprising an iron alloy according to the prior art.
Figure 6:
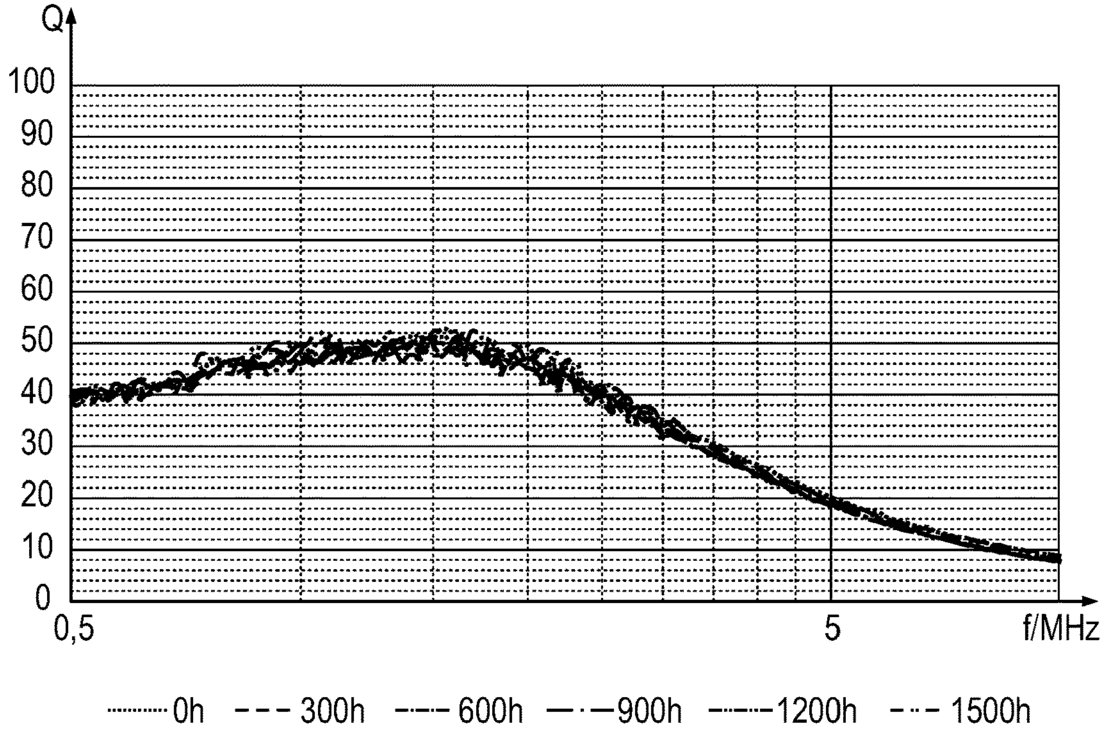
FIG. 6 shows a diagram of the quality factor Q as a function of the frequency f and the time t for an inductive component according to the invention with ferrite material comprising manganese and zinc.

The components 1 according to the invention scarcely age thermally, and consequently ensure that the behaviour of an electrical circuit with the inductive components 1 according to the invention does not change as a result of parameters changing over time t, such as for example the quality factor Q or the AC voltage power loss $P_{AC}$, and their function is not impaired. A comparison of the measurement curves in FIG. 5 with the measurement curves in FIG. 6 illustrates that the quality factor Q of the inductive component 1 according to the invention scarcely changes over time t and the components 1 according to the invention scarcely age thermally.

It generally applies that:

The inductive component 1 has at least one coil 2. Preferably, the inductive component 1 has precisely one coil or precisely two coils.

The sintered particles P created by comminuting the sintered basic body $G_S$ can be worked, separated and/or selected in any desired way. The sequence of the steps mentioned can be as desired here. Known filters and/or screens and/or separators can be used for the separating and/or selecting. The working, separating and/or selecting of the sintered particles P allow the electromagnetic properties of the inductive component 1 to be set in the desired way. In particular, the inductance, the saturation behaviour and/or the air gap can be set.

The activating of the binder B may be performed by cold pressing or hot pressing.

The magnetic material M, and consequently the at least one magnetic core 3, 4, preferably comprises at least one ferrite material. Ferrite material is available at low cost and easily. The use of ferrite material means that comparatively good electromagnetic properties of the inductive component 1 are achieved. In particular, the inductive component 1 has a high inductance, a desired saturation behaviour, low losses and/or can be operated at a high voltage. Such inductive components 1 can for example withstand a high potential test (AC HiPot test) at a voltage of 3 $kV_{AC}$ (3 mA, 3 sec).

The sintered particles are denoted generally by P. The aspect ratio is denoted generally by A. The minimum dimension is denoted generally by $A_{min}$. The maximum dimension is denoted generally by $A_{max}$.

What is claimed is:

1. A method for producing an inductive component with the steps of:

providing a basic body comprising a magnetic material;

sintering the basic body;

comminuting the sintered basic body to form sintered particles;

producing at least one mixture from the sintered particles and a binder, wherein, before producing the at least one mixture, the sintered particles are separated into a first fraction with first sintered particles and into a second fraction with second sintered particles, wherein the first sintered particles and the second sintered particles differ in at least one of a particle form and a particle size;

arranging the at least one mixture and at least one coil in a mold; and activating the binder in the at least one mixture, so that the sintered particles form with the binder at least one magnetic core, which at least partially surrounds the at least one coil, wherein a first magnetic core is produced with the first sintered particles and a second magnetic core is produced with the second sintered particles, wherein at least 70% of the sintered particles used for producing the at least one mixture have a respective minimum dimension $A_{min}$, for which the following applies: $10\ \mu m \leq A_{min} \leq 1000\ \mu m$.

2. The method according to claim 1, wherein the magnetic material comprises at least one ferrite material.

3. The method according to claim 1, wherein the sintering is performed at a temperature $T_S$, where: $T_S \geq 1000°$ C.

4. The method according to claim 1, wherein the sintered particles have a respective aspect ratio and, before producing the at least one mixture, the aspect ratios are at least partially reduced.

5. The method according to claim 1, wherein, before producing the at least one mixture, the sintered particles are worked by means of a ball mill.

6. The method according to claim 1, wherein at least 70% of the sintered particles used for producing the at least one mixture have a respective aspect ratio A, for which the following applies: $0.5 \leq A \leq 1$.

7. The method according to claim 1, wherein the binder is activated by increasing at least one of the group comprising a temperature and by increasing a pressure.

8. The method according to claim 1, wherein the at least one mixture is produced in such a way that the following applies for a mass ratio m of the sintered particles to the binder: $75/25 \leq m \leq 99/1$.

9. The method according claim 1, wherein the basic body is provided by pressing the magnetic material.

10. A method for producing an inductive component with the steps of:

providing a basic body comprising a magnetic material;

sintering the basic body;

comminuting the sintered basic body to form sintered particles;

producing at least one mixture from the sintered particles and a binder, wherein, before producing the at least one mixture, the sintered particles are separated into a first fraction with first sintered particles and into a second fraction with second sintered particles, wherein the first sintered particles and the second sintered particles differ in at least one of a particle form and a particle size;

arranging the at least one mixture and at least one coil in a mold; and activating the binder in the at least one mixture, so that the sintered particles form with the binder at least one magnetic core, which at least partially surrounds the at least one coil, wherein a first magnetic core is produced with the first sintered particles and a second magnetic core is produced with the second sintered particles, wherein at least 70% of the first sintered particles have a respective minimum dimension $A_{1min}$ and at least 70% of the second sintered particles have a respective minimum dimension $A_{2min}$, for which the following applies: $500\ \mu m \leq A_{1min} \leq 1000\ \mu m$ and $10\ \mu m \leq A_{2min} \leq 500\ \mu m$.

11. The method according to claim 10, wherein for the minimum dimension $A_{2min}$ of the second sintered particles applies: $100\ \mu m \leq A_{2min} \leq 500\ \mu m$.

* * * * *